United States Patent
Fusi et al.

(10) Patent No.: US 11,604,992 B2
(45) Date of Patent: Mar. 14, 2023

(54) PROBABILISTIC NEURAL NETWORK ARCHITECTURE GENERATION

(71) Applicant: Microsoft Technology Licensing, LLC, Redmond, WA (US)

(72) Inventors: Nicolo Fusi, Watertown, MA (US); Francesco Paolo Casale, Boston, MA (US); Jonathan Gordon, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 1061 days.

(21) Appl. No.: 16/179,433

(22) Filed: Nov. 2, 2018

(65) Prior Publication Data

US 2020/0143231 A1 May 7, 2020

(51) Int. Cl.
*G06N 3/04* (2006.01)
*G06N 3/082* (2023.01)
*G06N 3/08* (2023.01)
*G06F 18/21* (2023.01)
*G06F 18/214* (2023.01)
*G06N 3/047* (2023.01)

(52) U.S. Cl.
CPC ........... *G06N 3/082* (2013.01); *G06F 18/217* (2023.01); *G06F 18/2148* (2023.01); *G06N 3/047* (2023.01); *G06N 3/08* (2013.01)

(58) Field of Classification Search
CPC .............................. G10L 17/18; G06N 3/0454
USPC ........... 600/544; 434/350; 455/436; 382/162
See application file for complete search history.

(56) References Cited

U.S. PATENT DOCUMENTS

| | | | |
|---|---|---|---|
| 11,200,511 B1 * | 12/2021 | London | G06N 20/00 |
| 2014/0358831 A1 | 12/2014 | Adams et al. | |
| 2017/0243114 A1 | 8/2017 | Kurata | |
| 2019/0005402 A1 * | 1/2019 | Mohseni | G06N 10/00 |

(Continued)

OTHER PUBLICATIONS

Baker, et al., "Designing Neural Network Architectures using Reinforcement Learning", In Journal of The Computing Research Repository, Nov. 7, 2016, 18 Pages.

(Continued)

*Primary Examiner* — Kiet M Doan

(57) ABSTRACT

Examples of the present disclosure describe systems and methods for probabilistic neural network architecture generation. In an example, an underlying distribution over neural network architectures based on various parameters is sampled using probabilistic modeling. Training data is evaluated in order to iteratively update the underlying distribution, thereby generating a probability distribution over the neural network architectures. The distribution is iteratively trained until the parameters associated with the neural network architecture converge. Once it is determined that the parameters have converged, the resulting probability distribution may be used to generate a resulting neural network architecture. As a result, intermediate architectures need not be fully trained, which dramatically reduces memory usage and/or processing time. Further, in some instances, it is possible to evaluate bigger architectures and/or larger batch sizes while also reducing neural network architecture generation time and maintaining or improving neural network accuracy.

20 Claims, 8 Drawing Sheets

(56) References Cited

U.S. PATENT DOCUMENTS

2019/0155996 A1* 5/2019 Zoldi .................. G06F 21/105

OTHER PUBLICATIONS

Bergstra, et al., "Algorithms for Hyper-Parameter Optimization", In the Proceedings of Advances Neural Information Processing Systems, Jan. 1, 2011, pp. 2546-2554.

Bergstra, et al., "Random Search for Hyper-Parameter Optimization", The Journal of Machine Learning Research vol. 13, Feb. 2012, pp. 281-305.

Bornschein, "Reweighted wake-sleep", In International Conference on Learning Representations, Apr. 16, 2015, 12 Pages.

Carlin, et al., "Empirical Bayes: Past, present and future", In Journal of the American Statistical Association, vol. 35, Issue 452, Dec. 1, 2000, 9 Pages.

Deely, et al., "Bayes empirical bayes", In Journal of the American Statistical Association, vol. 76, Issue 376, Dec. 1, 1981, pp. 833-841.

Feurer, et al., "Efficient and robust automated machine learning", In Advances in Neural Information Processing Systems, Jan. 2015, 9 Pages.

Fusi, et al., "Probabilistic matrix factorization for automated machine learning", In Advances in Neural Information Processing Systems, May 1, 2018, 14 Pages.

Gelman, et al., "Bayesian Data Analysis", In Journal of Epidemiology, vol. 146, Issue 4, Nov. 27, 2013, 4 Pages.

Howard, et al., "Mobilenets: Efficient convolutional neural networks for mobile vision applications", In the Computing Research Repository, Apr. 17, 2017, 9 Pages.

Huang, et al., "Densely connected convolutional networks", In Proceedings of the IEEE Conference on Computer Vision and Pattern Recognition, Jul. 21, 2017, pp. 4700-4708.

Hutter, et al., "Sequential Model-Based Optimization for General Algorithm Configuration", In the Proceedings of the International Conference on Learning and Intelligent Optimization, Jan. 17, 2011, pp. 507-523.

Le, et al., "Revisiting reweighted wake-sleep", In Journal of The Computing Research Repository, May 26, 2018, 12 Pages.

Liu, et al., "DARTS: Differentiable Architecture Search", In Journal of Computing Research Repository, Jun. 24, 2018, pp. 1-12.

Liu, et al., "Hierarchical Representations for Efficient Architecture Search", In Journal of Computing Research Repository, Nov. 1, 2017, pp. 1-13.

Liu, et al., "Progressive neural architecture search", In Journal of Computing Research Repository, Dec. 2, 2017, 11 Pages.

McInerney, James, "An Empirical Bayes Approach to Optimizing Machine Learning Algorithms", In Advances in Neural Information Processing Systems, Jan. 2017, pp. 2712-2721.

Mendoza, et al., "Towards Automatically-Tuned neural networks", In Proceedings of the Workshop on Automatic Machine Learning, Dec. 4, 2016, pp. 58-65.

Negrinho, et al., "DeepArchitect: Automatically designing and training deep architectures", In Computing Research Repository, Apr. 28, 2017, pp. 1-12.

Pham, et al., "Efficient Neural Architecture Search via Parameters Sharing", In Proceedings of Machine Learning Research, Feb. 9, 2018, 11 Pages.

Rasmussen, et al., "Gaussian Processes for Machine Learning", by MIT Press, vol. 2, Issue 3, Jan. 2006, 266 Pages.

Real, et al., "Regularized evolution for image classifier architecture search", In Journal of the Computing Research Repository, Feb. 5, 2018, 16 Pages.

Snoek, et al., "Practical Bayesian Optimization of Machine Learning Algorithms", In Proceedings of Advances in Neural Information Processing Systems, Dec. 31, 2012, 9 Pages.

Snoek, et al., "Scalable Bayesian Optimization Using Deep Neural Networks", In the Proceedings of the 32nd International Conference on International Conference on Machine Learning, vol. 37, Jun. 1, 2015, 10 Pages.

Szegedy, et al., "Going Deeper with Convolutions", In Proceedings of the IEEE Conference on Computer Vision and Pattern Recognition, Jun. 7, 2015, pp. 1-9.

Xie, et al., "Genetic CNN", In Proceedings of the IEEE International Conference on Computer Vision, Oct. 22, 2017, pp. 1388-1397.

Zhang, et al., "Shufflenet: An extremely efficient convolutional neural network for mobile devices", In Journal of Computing Research Repository, Jul. 4, 2017, 9 Pages.

Zoph, et al., "Learning transferable architectures for scalable image recognition", In Proceedings of the IEEE Conference on Computer Vision and Pattern Recognition, Jul. 2017, 14 Pages.

Zoph, et al., "Neural Architecture Search with Reinforcement Learning", In Proceedings of 5th International Conference on Learning Representations, Nov. 5, 2016, pp. 1-15.

"International Search Report and Written Opinion Issued in PCT Application No. PCT/US19/058418", dated Feb. 14, 2020, 14 Pages.

"Office Action Issued in Indian Patent Application No. 202117018791", dated Dec. 20, 2022, 8 Pages.

* cited by examiner

PROBABILISTIC NEURAL NETWORK ARCHITECTURE GENERATION

BACKGROUND

The accuracy and performance of a neural network is dependent on its architecture. However, designing a neural network architecture is a time- and resource-intensive task. While techniques exist to automate aspects of the architecture design process, traditional techniques require large amounts of memory and processing time.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for probabilistic neural network architecture generation. In an example, neural network architectures are sampled from an underlying probability distribution over architectures based on various parameters. Training data is evaluated in order to iteratively update the underlying distribution probability over the neural network architectures. For example, an importance-weighted Monte Carlo approach is used to generate gradient estimators and tune the underlying probability distribution using the training data accordingly.

The distribution is iteratively trained either for a fixed number of iterations or until the parameters associated with the neural network architecture converge. After this training phase, the probability distribution may be used to generate a resulting neural network architecture. In another example, the neural network architecture with highest probability according to the trained probability distribution may be selected. As a result, aspects of the present disclosure avoid the need to fully train intermediate architectures or to evaluate the complete search graph, which dramatically reduces memory usage and/or processing time. Further, in some instances, it is possible to evaluate bigger architectures and/or larger batch sizes while still reducing neural network architecture generation time and maintaining or improving neural network accuracy.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
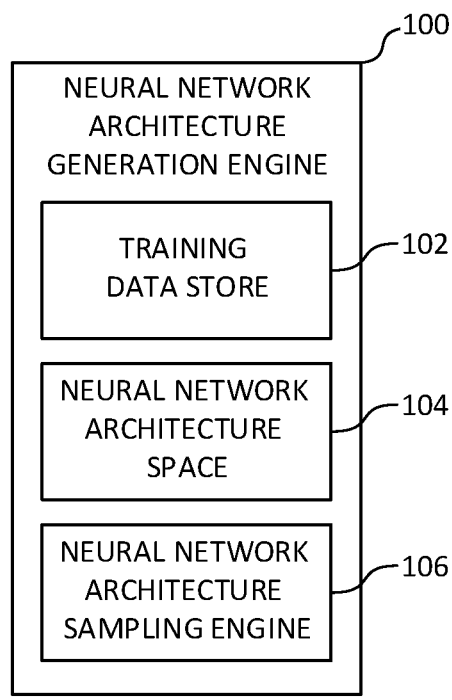
FIG. 1 illustrates an overview of an example system for probabilistic neural network architecture generation.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Traditional techniques for automating the design of a neural network architecture require large amounts of memory and processing time. For example, searching a neural network architecture space (e.g., using reinforcement learning, evolutionary approaches, etc.) for an architecture having "good" accuracy requires fully training and evaluating each architecture in the search, which is compute-intensive. Other search techniques incrementally train subsequent architectures in the search space (as compared to fully retraining each architecture), which reduces the associated processing time but increases memory consumption. As a result of the tradeoff between computational cost and memory consumption, "surrogates" have also been used, wherein architecture surrogates are used as scaled-down, representative models of various architectures (e.g., with fewer layers, motifs, filters, etc.), while a dataset surrogate is used as a proxy for the full dataset. Both types of surrogates aim to reduce the resource requirements of the search. However, all of the above-discussed search techniques require fully training each architecture in order to ultimately search for and identify an accurate neural network architecture.

Accordingly, the present disclosure provides systems and methods for probabilistic neural network architecture generation. In examples, probabilistic modeling is used to define and iteratively learn a probability distribution over neural network architectures controlled by various parameters. A probability distribution over the neural network architectures is estimated using training data. For example, an importance-weighted Monte Carlo approach is used to generate gradient estimators and tune the underlying probability distribution based on the training data accordingly. The distribution is iteratively trained either for a fixed number of iterations or until the parameters associated with the neural network architecture converge, among other termination criteria. As a result, aspects of the present disclosure avoid the need to fully train intermediate architectures or to evaluate the complete search graph, which dramatically reduces memory usage and/or processing time. In some instances, it is possible to evaluate bigger architectures, use a larger surrogate dataset, and/or consider larger batch sizes while maintaining or reducing memory and computational requirements. In some instances, the entire dataset may be used.

As used herein, an "optimized" or "accurate" architecture, or an architecture having "good" accuracy, may be used interchangeably. In examples, an accurate architecture is identified based on a predetermined threshold, wherein the percentage of data that the neural network architecture correctly classifies is above the predetermined threshold. In other examples, an accurate architecture is identified based on the loss associated with the neural network architecture being below the predetermined threshold. While example metrics for determining the accuracy of neural network architectures are described herein, it will be appreciated that any of a variety of other techniques may be used.

FIG. 1 illustrates an overview of an example system 100 for probabilistic neural network architecture generation. In examples, neural network architecture generation engine 100 is used to probabilistically generate a neural network architecture for processing data according to aspects described herein. Neural network architecture generation engine 100 may be part of a computing device, including, but not limited to, a server computing device, a distributed computing device, a desktop computing device, a laptop computing device, a tablet computing device, or a mobile computing device. Further, while neural network architecture generation engine 100 is described as comprising elements 102-106, it will be appreciated that, in some aspects, at least one of elements 102-106 is separate from neural network architecture generation engine 100. As an example, at least a part of the data stored by training data store 102 may be stored by a remote storage device.

Neural network architecture generation engine 100 is illustrated as comprising training data store 102, neural network architecture space 104, and neural network architecture sampling engine 106. In examples, training data store 102 stores supervised and/or unsupervised training data for processing when generating a neural network architecture as described herein. As an example, supervised data may comprise a set of inputs and an associated set of labels or outputs. As another example, unsupervised data may comprise a set of inputs. It will be appreciated that training data may comprise any of a variety of data types, including, but not limited to, graphical data (e.g., image data, video data, etc.), textual data (e.g., words, sentences, numbers, etc.), audio data (e.g., recorded speech, sounds, etc.), or any combination thereof.

Neural network architecture generation engine 100 is further illustrated as comprising neural network architecture space 104. In examples, neural network architecture space 104 is used to sample a neural network architecture associated with one or more distributions of neural network architecture parameters that are evaluated by neural network architecture sampling engine 106 according to aspects described herein. In examples, network parameters are associated with a sampled neural network architecture that is described by the neural network architecture parameters. Thus, as compared to alternative techniques that store architecture and/or network parameters for all possible architectures of a search space in memory, neural network architecture space 104 may store only one neural network architecture and a subset of applicable parameters, thereby reducing memory consumption. In examples, at least a part of neural network architecture space 104 is stored in system memory (e.g., memory accessible by a central processing unit (CPU) of the computing device) and/or in the memory of a graphical processing unit (GPU). In some examples, multiple CPUs and/or GPUs are used to store and/or process aspects of neural network architecture space 104. As another example, at least a part of neural network architecture space 104 is stored on a storage device, such as a local storage device or a remote storage device.

As an example, neural network architecture space 104 comprises one or more cells, wherein each cell is a directed acyclic graph of ordered nodes. Each node may represent a feature representation, and edges between nodes may be associated with an operation. A neural network architecture may be defined as a stack of cells, wherein the output of one cell is provided as an input to a subsequent cell for further processing. In examples, the architecture of each cell is generated separately (e.g., by neural network architecture sampling engine 106). In other examples, architectures for multiple cells may be generated contemporaneously. In examples, parameters may include architecture parameters and network parameters. For example, architecture parameters may comprise a set of possible operations for each edge within a cell and/or the number of nodes within the cell, whereas network parameters may comprise a set of weights associated with such edges. Thus, architecture parameters may relate to the overall structure of the neural network architecture, whereas network parameters may relate to properties within the neural network architecture based on the structure associated with the architecture parameters. Accordingly, neural network architecture space 104 may be sampled based on a set of distributions over the set of possible operations and a set of distributions over edge weights. It will be understood that, in other examples, neural network architecture space 104 may comprise a different structure and/or different parameters may be used.

Neural network architecture sampling engine 106 probabilistically generates a neural network architecture according to aspects described herein. In an example, neural network architecture sampling engine 106 samples a possible neural network architecture from neural network architecture space 104. As an example, values are determined using the probability distribution associated with each parameter, such that the neural network architecture described by the determined values is evaluated using training data from training data store 102. In examples, the objective is to minimize the value of a loss function associated with the neural network architecture and/or increase the accuracy of the neural network architecture when processing input data to generate one or more outputs (e.g., labels, classifications, etc.).

One or more probability distributions associated with the parameters may be updated accordingly. In examples, gradient estimators are used to update the probability distributions accordingly, such as the example gradient estimators below:

$$\sum_k \tilde{w}_k \nabla_\theta \log p_\theta(y \mid x, \alpha_k) \stackrel{\Delta}{=} \tilde{\nabla}_\theta$$

$$\sum_k \tilde{w}_k \nabla_\pi \log p(\alpha_k \mid \pi) \stackrel{\Delta}{=} \tilde{\nabla}_\pi$$

-continued

Where $\alpha_k \sim p(\alpha \mid \pi)$ and $\tilde{w}_k = \dfrac{p_\theta(y \mid x, \alpha_k)}{\sum_j p_\theta(y \mid x, \alpha_j)}$.

In the above equations, θ represents network parameters, while π represents hyperparameters of the prior distribution on α, ρ(α|π). In the context of the example discussed above with respect to neural network architecture space 104, θ may represent network parameters comprising weights associated with edges (e.g., layers) within a cell, while π may parameterize a set of probabilities for architecture parameters relating to possible operations for each edge, such that α represents a sample of the possible operations from π.

Neural network architecture sampling engine 106 may perform numerous iterations of the above steps, thereby continually refining the probability distribution on architectures so as to tune the underlying distribution based on the training data in training data store 102. Neural network architecture sampling engine 106 may stop iterating at a predetermined number of iterations or when it is determined that the validation accuracy of sampled neural network architectures is converging on a certain value (e.g., plateauing). It will be appreciated that while example termination criteria (e.g., a set number of iterations, definition of convergence, etc.) are described, any of a variety of other criteria may be used according to aspects described herein. Once learning of the underlying distribution is complete, a resulting neural network architecture is generated either by sampling from the distribution or by taking statistics of it. For example, the mode of the resulting distribution may be taken and used to define the parameters (e.g., architecture parameters, network parameters, etc.) of the neural network architecture. In other examples, a median or average may be generated, among other techniques.

Figure 2:
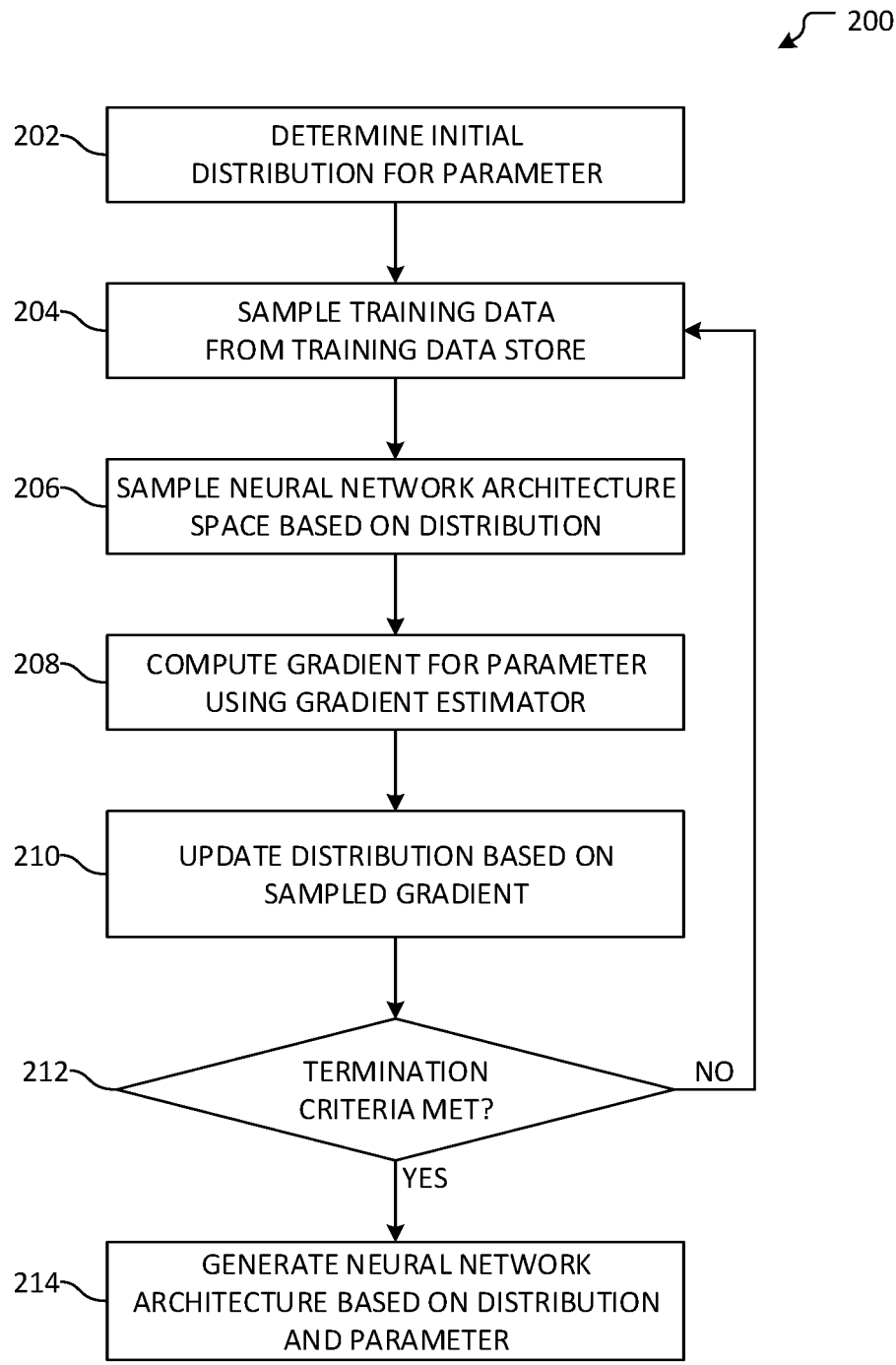
FIG. 2 illustrates an overview of an example method for probabilistic neural network architecture generation.

FIG. 2 illustrates an overview of an example method 200 for probabilistic neural network architecture generation. In examples, aspects of method 200 may be performed by a neural network architecture generation engine, such as neural network architecture generation engine 100 in FIG. 1. Aspects of method 200 may be performed by a computing device, including, but not limited to, a server computing device, a distributed computing device, a desktop computing device, a laptop computing device, a tablet computing device, or a mobile computing device.

At operation 202, an initial distribution for parameters is determined. In examples, an initial distribution is determined for architecture parameters and another initial distribution is determined for network parameters. In examples, architecture parameters may comprise types of operations, which include, but are not limited to concatenate layers, sum layers, 3×3 average pooling, 3×3 max pooling, identity transformation, 3×3 separable convolutions, 5×5 separable convolutions, 3×3 dilated separable convolutions, 5×5 dilated separable convolutions, and/or a zero or mask operation, among other examples. As another example, network parameters may include weights associated with the edges/layers.

In an example, an initial distribution may be determined based on one or more pre-existing neural network architectures having a similar use case. In another example, the initial distribution may be a probability distribution associated with a surrogate neural network architecture that was identified using a dataset surrogate (e.g., a subset of training data, or a different dataset entirely), which may then be applied to the dataset of interest so as to fine-tune the resulting neural network architecture in the context of the latter dataset. In some instances, the initial distribution may be based on a larger training dataset, whereas the dataset used to fine-tune the resulting neural network architecture may be a smaller training dataset or vice-versa. In another example, the initial distribution may be generated based on attributes associated with the training data for which the neural network architecture will be used. It will be appreciated that other initial distributions may be used without departing from the spirit of this disclosure. As an example, a uniform distribution may be used. While aspects of method 200 are described with respect to a single parameter and a single distribution, it will be appreciated that, in other examples, multiple parameters and/or distributions may be used.

Flow progresses to operation 204, where training data is sampled from a training data store. As an example, training data may be sampled from training data store 102 in FIG. 1. As described above, the training data may be supervised and/or unsupervised training data. In some examples, specific training data may be used so as to generate a neural network architecture tuned for a specific purpose, while, in other examples, a general set of training data may be used. Training data may comprise any of a variety of data types, including, but not limited to, graphical data (e.g., image data, video data, etc.), textual data (e.g., words, sentences, numbers, etc.), audio data (e.g., recorded speech, sounds, etc.), or any combination thereof. In examples, training data is sampled randomly, sequentially, or using any of a variety of other techniques.

At operation 206, a neural network architecture space is sampled using the initial distribution for the parameter (as was determined at operation 202), thereby generating a specific neural network architecture from the neural network architecture space that is described by parameter values using the initial probability distribution. For example, the neural network architecture space may be neural network architecture space 104 in FIG. 1. The sampled neural network architecture may be defined as $\alpha_k \sim p(\alpha \mid \pi)$, wherein π represents hyperparameters of the prior distribution on α, p(α|π). Thus, α may be a set of discrete random variables associated with different architecture parameters of the neural network architecture, while $\alpha_k$ is a sample from p(α|π), which represents a neural network architecture defined by values for each of the discrete architecture parameters based on the probability distribution π.

Moving to operation 208, for each sampled neural network architecture $\alpha_k$, one or more gradient estimators are computed. For example, gradients may be computed for the θ and π parameters. In such an example, the below gradient estimators may be used:

$$g_\theta^{(k)} \leftarrow \nabla_\theta \log p_\theta(y \mid x, \alpha_k)$$

$$g_\pi^{(k)} \leftarrow \nabla_\pi \log p(\alpha_k \mid \pi)$$

In examples, such gradient estimators for each sampled neural network architecture are used to estimate overall gradients. Each sample may be weighted when estimating overall gradients. As an example, samples may be weighted according to their accuracy, such that a weight for a given sample, k, is determined based on the below equation:

$$w_k = p_\theta(y \mid x, \alpha_k)$$

Accordingly, $\tilde{\nabla}_\theta$ and $\tilde{\nabla}_\pi$ may be calculated by taking the mode of each of the estimated gradients for each sample. For example, as discussed above, the mode may be calculated using the equations similar to those below:

$$\sum_k \tilde{w}_k g_\theta^{(k)} \triangleq \tilde{\nabla}_\theta$$

$$\sum_k \tilde{w}_k g_\pi^{(k)} \triangleq \tilde{\nabla}_\pi$$

Where $$\tilde{w}_k = \frac{p_\theta(y \mid x, \alpha_k)}{\sum_j p_\theta(y \mid x, \alpha_j)},$$

such that the weights are normalized and sum to 1.

As a result, gradient descent techniques can be used to update the parameters of the distributions according to the direction of the estimated gradients. It will be appreciated that other techniques may be used for updating the parameters based on multiple training data samples, including, but not limited to, an average or a median.

At operation 210, the distribution for the parameter is updated based on the sampled gradient. As an example, if it is determined that the accuracy sampled neural network architecture has improved as compared to the current distribution from which the neural network architecture was sampled, the distribution may be updated, such that a neural network architecture defined by the same or similar value for the parameter is more likely to be sampled in the future. For example, the estimated gradient is used to update the parameters associated with the distributions in the appropriate direction, as may be indicated by the gradient.

Flow progresses to determination 212, where it is determined whether termination criteria are met. For example, it may be determined whether the validation accuracy of the sampled neural network architecture converged on a certain value (e.g., whether the accuracy is plateauing). The validation accuracy may be compared to a predetermined threshold, such that a change below the predetermined threshold may constitute convergence. In another example, determination 212 may evaluate whether a predetermined number of iterations has been performed. It will be appreciated that any of a variety of other termination criteria may be used according to aspects described herein. If it is determined that the parameter is not converging, flow branches "NO" to operation 204, where operations 204-212 may be performed based on the updated distribution generated at operation 210.

If, however, it is determined that one of the termination criteria are met, flow instead branches "YES" to operation 214, where a neural network architecture is generated based on the iteratively tuned distribution that is generated by performing operations 204-210 as discussed above. In examples, the mode of a tuned distribution associated with architecture parameters may be taken and used as the architecture parameters describing the neural network architecture, while the mode of a tuned distribution associated with the network parameters may be taken and used as the network parameters accordingly. In other examples, a median or average may be taken, among other techniques. Flow terminates at operation 214.

It will be appreciated that method 200 is described with respect to a single parameter for convenience, but that, in other examples, multiple parameters and associated distributions may be evaluated according to aspects described herein. For example, each parameter may be drawn from a probability distribution, wherein the initial distribution for each parameter is determined at operation 202. When sampling the neural network architecture at operation 206, a value is determined for each architecture parameter based on their probability distribution, such that the sampled neural network architecture is described by each of the determined values. At operation 208, gradient estimators are used for each parameter in order to evaluate the effect on the overall accuracy of the neural network associated with changing each parameter value. Accordingly, the respectively probability distributions are updated at operation 210 to further tune the distributions based on the training data.

Figure 3B:
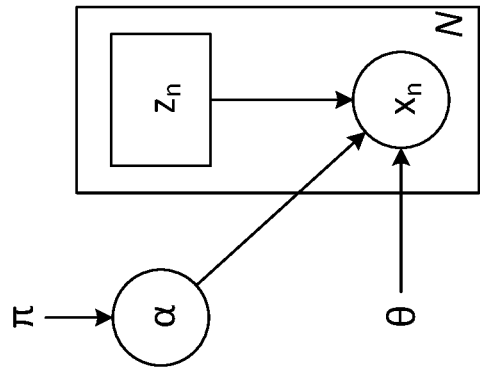
FIG. 3B illustrates an overview of an example probabilistic model for an unsupervised setting.
Figure 3A:
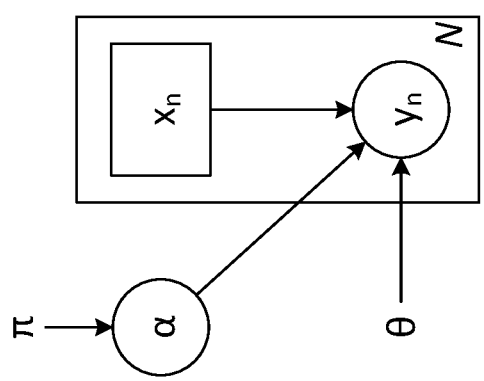
FIG. 3A illustrates an overview of an example probabilistic model for a supervised setting.

FIG. 3A illustrates an overview of an example probabilistic model 300 for a supervised setting. Model 300 is described in the context of the above-discussed example, in which θ represents sets of weights associated with different parts of a neural network architecture (e.g., operations, filters, etc.), while π represents hyperparameters of the prior distribution on α, p(α|π). In examples, α is a set of discrete variables associated with different architecture parameters of the neural network architecture, such that $\alpha_k$ may be a sample from p(α|π) that represents a neural network architecture defined by values for each of the discrete architecture parameters based on the probability distribution π.

Model 300 illustrates a supervised setting, in which $x_n$ is an input associated with a known (e.g., labeled) output $y_n$. As compared to an unsupervised setting that comprises input data, a supervised setting further comprises an associated set of output data (e.g., labels), which may be used when training the model to determine whether the model accurately categorizes the input data. Hyperparameters π is illustrated with a directional arrow to set of discrete variables α, thereby indicating that α is dependent on π, such that a discrete set of values for α may be determined using probability distribution with hyperparameters π. Model 300 further comprises a directional arrow from θ to $y_n$, so as to illustrate the relationship of network parameters θ with the weights of edges within the neural network architecture, in an example. Accordingly, in a supervised setting, the objective is to maximize the likelihood p(y|x, θ, α), which is the likelihood of observing an associated output (y) given the input (x), network parameters θ (e.g., a set of edge weights), and architecture parameters α (e.g., a set of discrete variables determined based on probability distribution π).

FIG. 3B illustrates an overview of an example probabilistic model 320 for an unsupervised setting. Model 320 is similar to model 300, as discussed above. However, rather than relating to training data having an input $x_n$ that is input associated with a known (e.g., labeled) output $y_n$, only inputs are available in an unsupervised setting. As a result, the objective in the context of model 320 is to maximize the accuracy of the neural network architecture, as may be described by the probability distribution log p(x), wherein x is input training data.

It will be appreciated that models 300 and 320, and the associated discussion of variables and functions, are provided as examples and other probabilistic models and/or maximization functions may be used. Further, while model 300 and 320 are described with respect to different training data sets (e.g., wherein one data set comprises supervised data while the other data set comprises unsupervised data), it will be appreciated that, in some instances, the training data may be a combination of supervised and unsupervised data.

Figure 4:
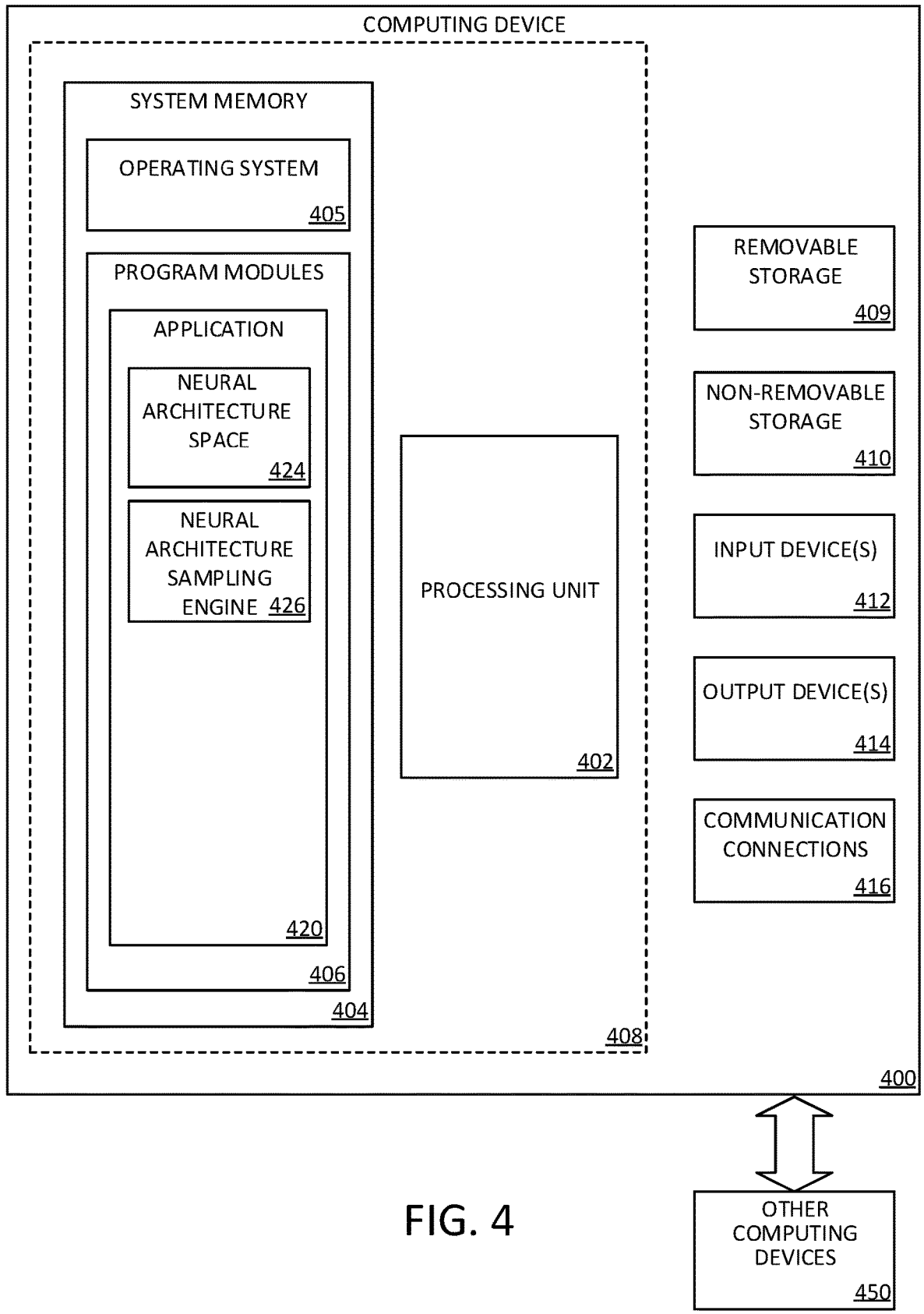
FIG. 4 is a block diagram illustrating example physical components of a computing device with which aspects of the disclosure may be practiced.

FIG. 4 is a block diagram illustrating physical components (e.g., hardware) of a computing device 400 with which aspects of the disclosure may be practiced. The computing device components described below may be suitable for the computing devices described above. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for performing the various aspects disclosed herein such as neural architecture space 424 and neural architecture sampling engine 426. The operating system 405, for example, may be suitable for controlling the operation of the computing device 400. Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., application 420) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5A:
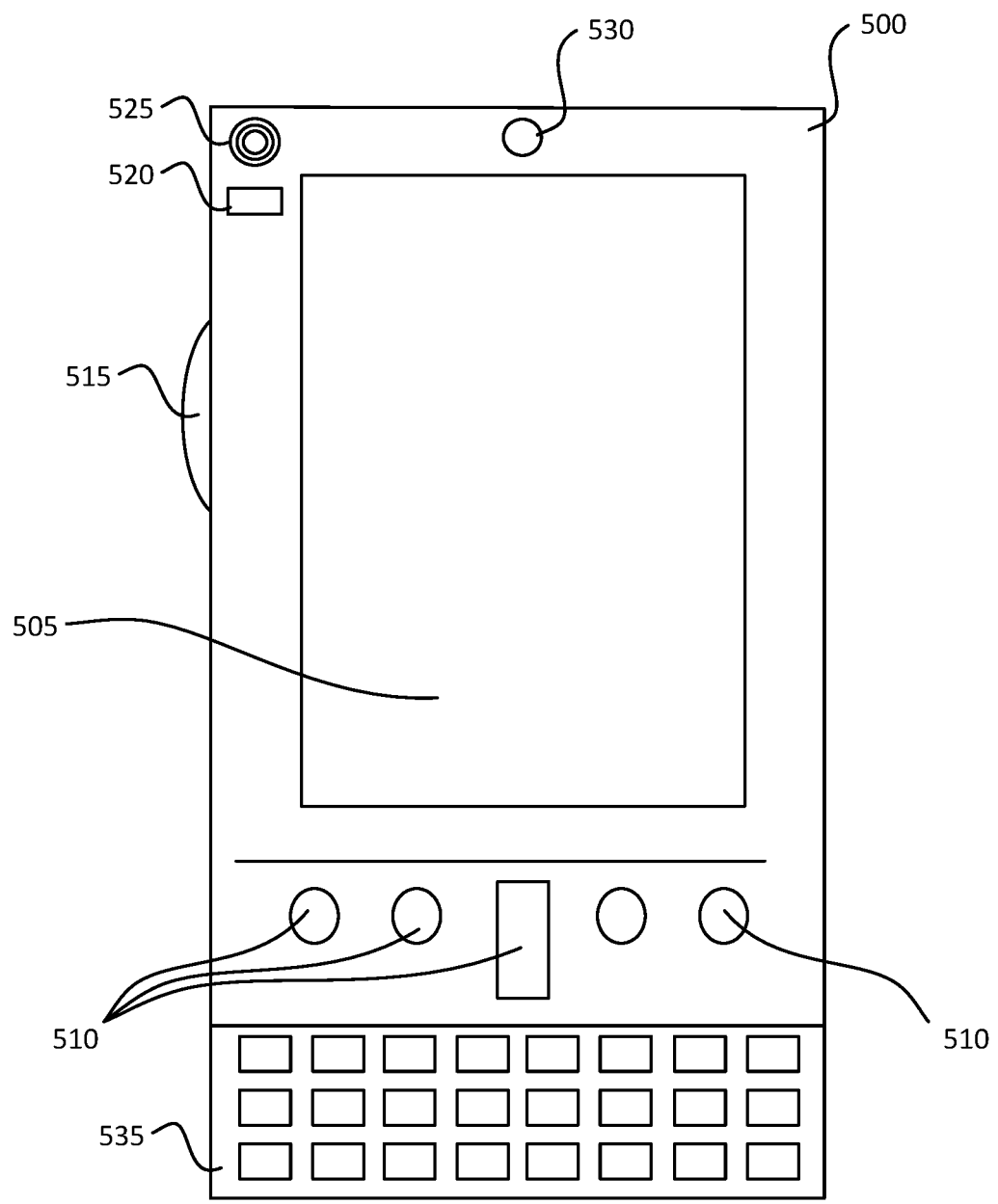
FIGS. 5A and 5B are simplified block diagrams of a mobile computing device with which aspects of the present disclosure may be practiced.
Figure 5B:
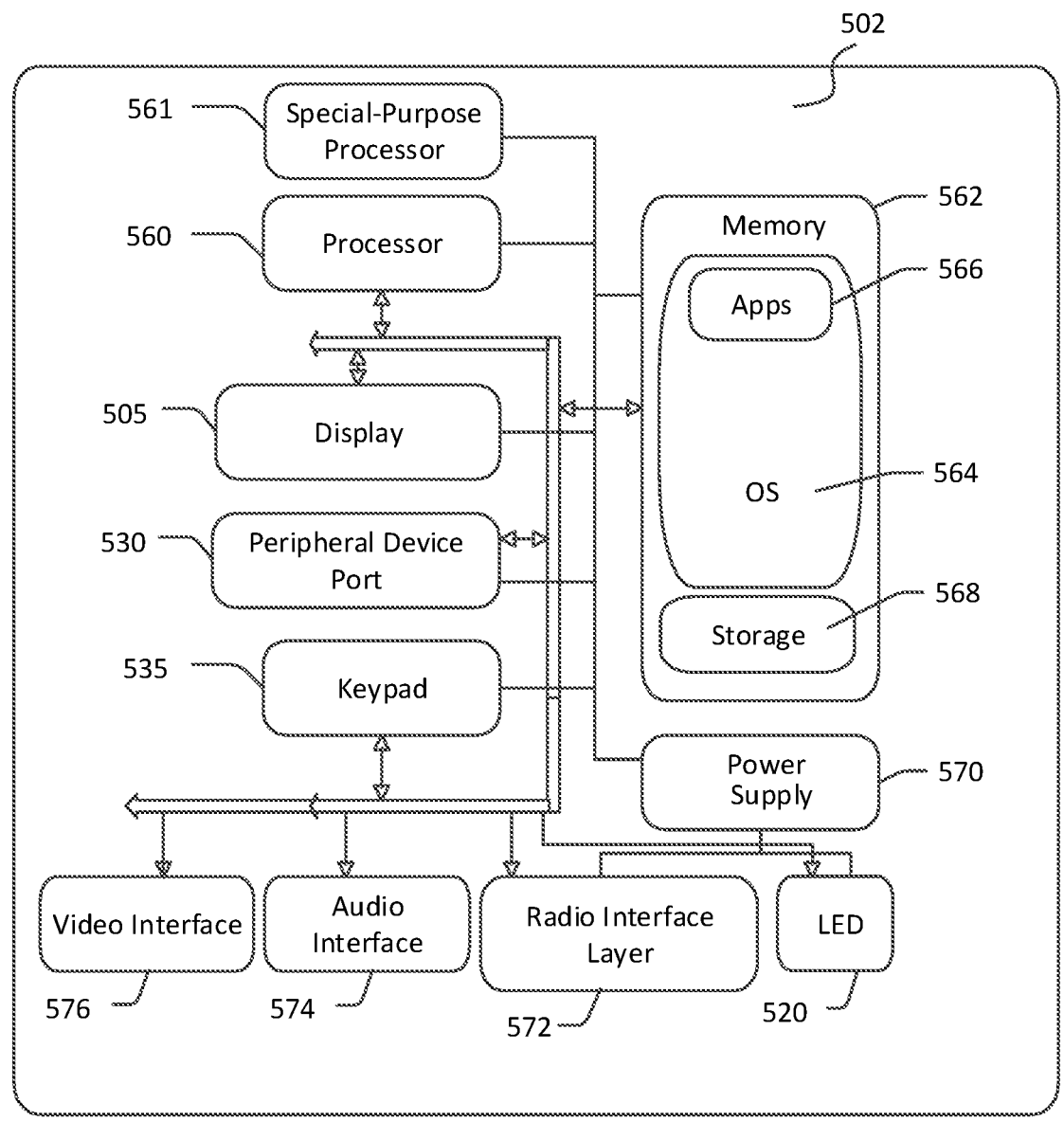

FIGS. 5A and 5B illustrate a mobile computing device 500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 5A, one aspect of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative aspects, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one aspect of a mobile computing device. That is, the mobile computing device 500 can incorporate a system (e.g., an architecture) 502 to implement some aspects. In one embodiment, the system 502 is implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500 described herein (e.g., search engine, extractor module, relevancy ranking module, answer scoring module, etc.).

The system 502 has a power supply 570, which may be implemented as one or more batteries. The power supply 570 might further include an external power source, such as an AC adapter or a powered docking cradle that supplements or recharges the batteries.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present disclosure, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio interface layer 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio interface layer 572 or via a distributed computing network. Similarly, such data/information may be readily transferred between computing devices for storage and use according to well-known data/information transfer and storage means, including electronic mail and collaborative data/information sharing systems.

Figure 6:
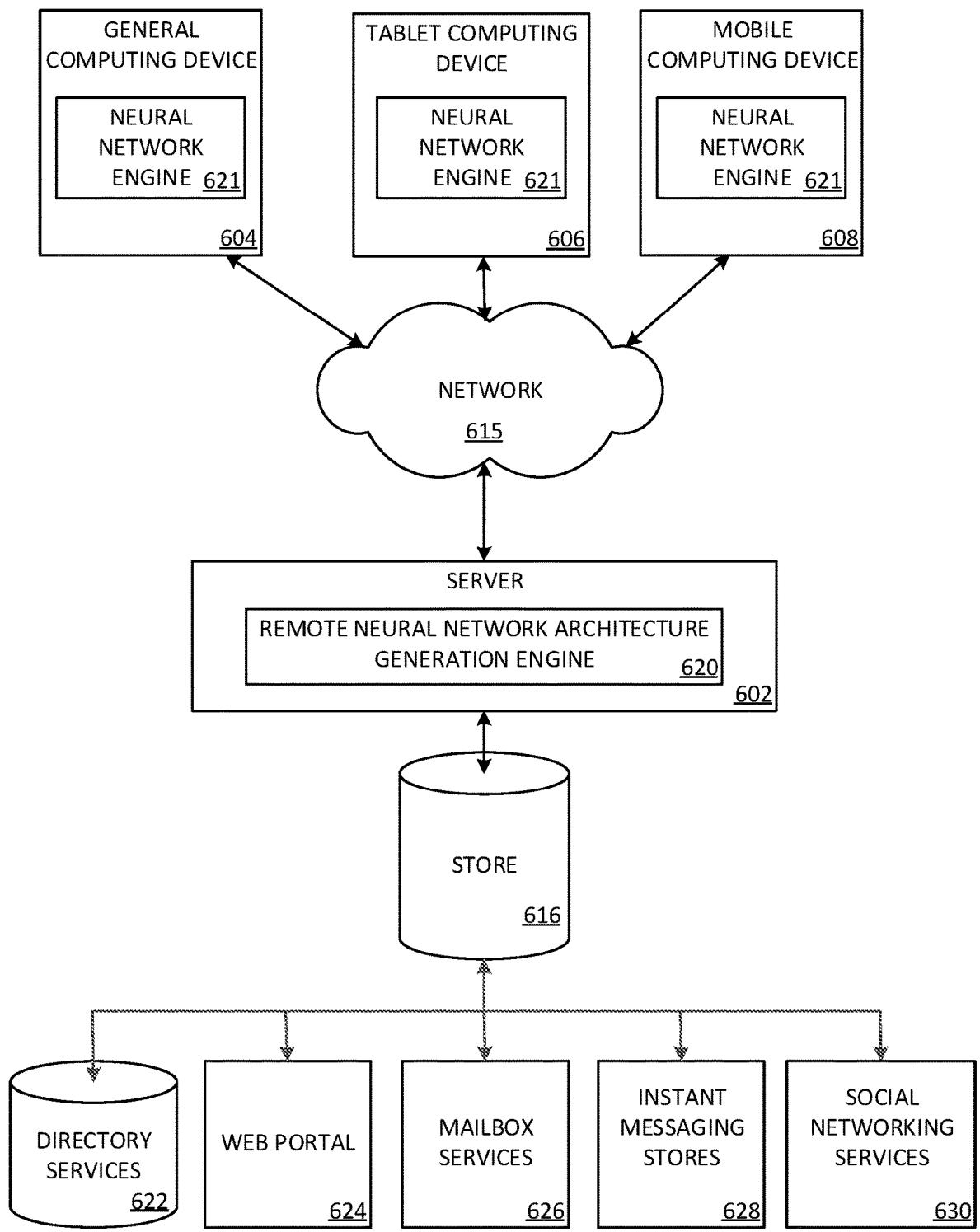
FIG. 6 is a simplified block diagram of a distributed computing system in which aspects of the present disclosure may be practiced.

FIG. 6 illustrates one aspect of the architecture of a system for processing data received at a computing system from a remote source, such as a personal computer 604, tablet computing device 606, or mobile computing device 608, as described above. Content displayed at server device 602 may be stored in different communication channels or other storage types. For example, various documents may be stored using a directory service 622, a web portal 624, a mailbox service 626, an instant messaging store 628, or a social networking site 630. Neural network engine 621 may be employed by a client that communicates with server device 602, and/or remote neural network architecture generation engine 620 may be employed by server device 602. The server device 602 may provide data to and from a client computing device such as a personal computer 604, a tablet computing device 606 and/or a mobile computing device 608 (e.g., a smart phone) through a network 615. By way of example, the computer system described above may be embodied in a personal computer 604, a tablet computing device 606 and/or a mobile computing device 608 (e.g., a smart phone). Any of these embodiments of the computing devices may obtain content from the store 616, in addition to receiving graphical data useable to be either pre-processed at a graphic-originating system, or post-processed at a receiving computing system.

Figure 7:
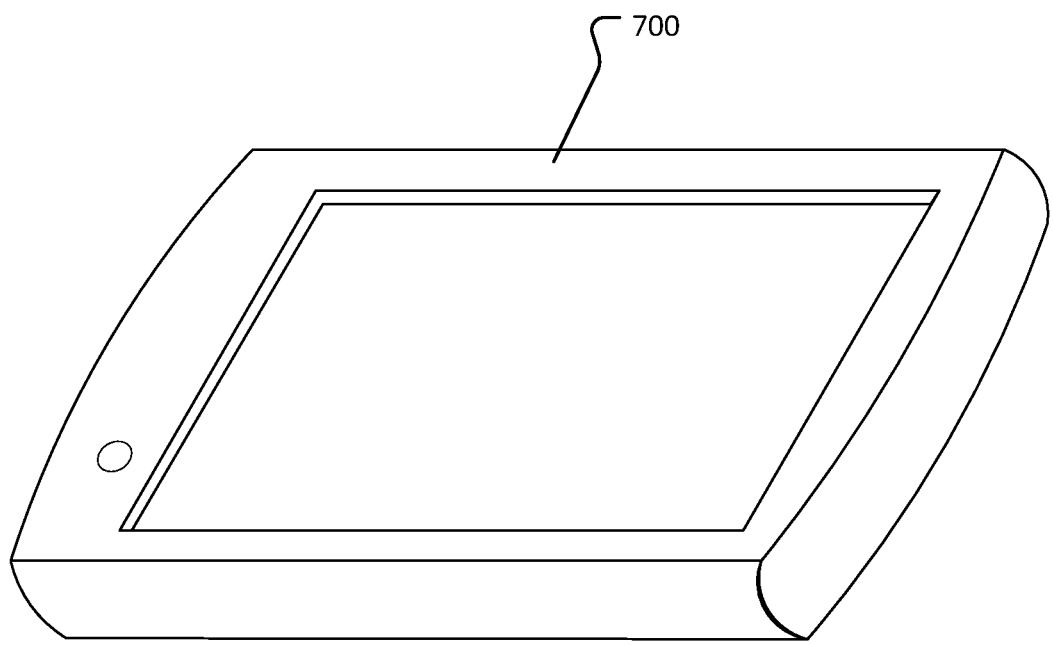
FIG. 7 illustrates a tablet computing device for executing one or more aspects of the present disclosure.

FIG. 7 illustrates an exemplary tablet computing device 700 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: sampling training data from a training data store; generating a sampled neural network architecture using a first probability distribution associated with a neural network architecture parameter, wherein a value is determined for the neural network architecture parameter based on the first probability distribution; evaluating the sampled training data using the sampled neural network architecture to compute a gradient of a loss function associated with the sampled neural network architecture; generating a second probability distribution for the neural network architecture parameter from the first probability distribution, based on the computed gradient of the loss function; evaluating the second probability distribution based on termination criteria to determine whether the termination criteria is satisfied; and when it is determined that the termination criteria is satisfied, generating a result neural network architecture having a value for the parameter based on the second probability distribution. In an example, the set of operations further comprises: when it is not determined that the termination criteria is satisfied, generating a second sampled neural network architecture using the second probability distribution; evaluating training data from the training data store using the second sampled neural network architecture to compute a gradient of a loss function associated with the second sampled neural network architecture; and generating a third probability distribution for the neural network architecture parameter from the second probability distribution. In another example, determining whether the termination criteria is satisfied comprises comparing a first accuracy of a neural network architecture associated with the second probability distribution and a second accuracy of a neural network architecture associated with the first probability distribution based on a predetermined threshold. In a further example, the sampled neural network architecture is generated from a neural network architecture space. In yet another example, set of operations further comprises: training the result neural network architecture using training data from the training data store. In a further still example, the first probability distribution is determined based on a neural network architecture that was determined using a surrogate dataset, wherein the surrogate dataset comprises a different set of training data from the training data store than a set of training data used when sampling training data from a training data store. In another example, first probability distribution is a uniform distribution.

In another aspect, the technology relates to a method for generating a neural network architecture. The method comprises: sampling training data from a training data store; determining, based on an initial probability distribution, a sample neural network architecture from a neural network architecture space; performing an evaluation of the sampled training data using the sample neural network architecture; updating, based on the evaluation, the initial probability distribution to generate an updated probability distribution; determining whether termination criteria is satisfied; and when it is determined that the termination criteria is satisfied, generating a result neural network architecture based on the updated probability distribution. In an example, performing the evaluation of the sampled training data comprises: evaluating the sampled training data using the sampled neural network architecture to compute a gradient of a loss function associated with the sampled neural network architecture. In another example, updating the initial probability distribution to generate the updated probability distribution comprises: updating the initial probability distribution to generate the updated probability distribution based on the computed gradient of the loss function. In a further example, determining whether the termination criteria is satisfied comprises comparing a first accuracy of a neural network architecture associated with the initial probability distribution and a second accuracy of a neural network architecture associated with the updated probability distribution based on a predetermined threshold. In yet another example, the method further comprises: training the result neural network architecture using training data from the training data store. In a further still example, the initial probability distribution is determined based on a surrogate neural network architecture that was determined using a dataset surrogate, wherein the dataset surrogate comprises a different set of training data from the training data store than a set of training data used when sampling training data from a training data store.

In a further aspect, the technology relates to another method for generating a neural network architecture. The method comprises: sampling training data from a training data store; generating a sampled neural network architecture using a first probability distribution associated with a neural network architecture parameter, wherein a value is determined for the neural network architecture parameter based on the first probability distribution; evaluating the sampled training data using the sampled neural network architecture to compute a gradient of a loss function associated with the sampled neural network architecture; generating a second probability distribution for the neural network architecture parameter from the first probability distribution, based on the computed gradient of the loss function; evaluating the second probability distribution based on termination criteria to determine whether the termination criteria is satisfied; and when it is determined that the termination criteria is satisfied, generating a result neural network architecture having a value for the parameter based on the second probability distribution. In an example, the method further comprises: when it is not determined that the termination criteria is satisfied, generating a second sampled neural network architecture using the second probability distribution; evaluating training data from the training data store using the second sampled neural network architecture to compute a gradient of a loss function associated with the second sampled neural network architecture; and generating a third probability distribution for the neural network architecture parameter from the second probability distribution. In another example, determining whether the termination criteria is satisfied comprises comparing a first accuracy of a neural network architecture associated with the second probability distribution and a second accuracy of a neural network architecture associated with the first probability distribution based on a predetermined threshold. In a further example, the sampled neural network architecture is generated from a neural network architecture space. In yet another example, the method further comprises: training the result neural network architecture using training data from the training data store. In a further still example, the first probability distribution is determined based on a surrogate neural network architecture that was determined using a dataset surrogate, wherein the dataset surrogate comprises a different set of training data from the training data store than a set of training data used when sampling training data from a training data store. In another example, the first probability distribution is a uniform distribution.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
at least one processor; and
memory storing instructions that, when executed by the at least one processor, causes the system to perform a set of operations, the set of operations comprising:
sampling training data from a training data store;
generating a sampled neural network architecture using a first probability distribution associated with a neural network architecture parameter, wherein a value is determined for the neural network architecture parameter based on the first probability distribution;
evaluating the sampled training data using the sampled neural network architecture to compute a gradient of a loss function associated with the sampled neural network architecture;
generating a second probability distribution for the neural network architecture parameter from the first probability distribution, based on the computed gradient of the loss function;
evaluating the second probability distribution based on termination criteria to determine whether the termination criteria is satisfied;
when it is determined that the termination criteria is satisfied, generating a result neural network architecture having a value for the parameter based on the second probability distribution; and
when it is determined that the termination criteria is not satisfied:
generating a second sampled neural network architecture using the second probability distribution;
evaluating training data from the training data store using the second sampled neural network architecture to compute a gradient of a loss function associated with the second sampled neural network architecture;
generating a third probability distribution for the neural network architecture parameter from the second probability distribution; and
generating the result neural network architecture having a value for the parameter based on the third probability distribution.

2. The system of claim 1, wherein determining whether the termination criteria is satisfied comprises comparing a first accuracy of a neural network architecture associated with the second probability distribution and a second accuracy of a neural network architecture associated with the first probability distribution based on a predetermined threshold.

3. The system of claim 1, wherein the sampled neural network architecture is generated from a neural network architecture space.

4. The system of claim 1, wherein the set of operations further comprises:
training the result neural network architecture using training data from the training data store.

5. The system of claim 1, wherein the first probability distribution is determined based on a neural network architecture that was determined using a surrogate dataset, wherein the surrogate dataset comprises a different set of training data from the training data store than a set of training data used when sampling training data from a training data store.

6. The system of claim 1, wherein the first probability distribution is a uniform distribution.

7. The system of claim 1, wherein the third probability distribution for the neural network architecture parameter is generated based on the computed gradient of the loss function associated with the second sampled neural network architecture.

8. A method for generating a neural network architecture, comprising:
sampling training data from a training data store;
determining, based on a first probability distribution, a sample neural network architecture from a neural network architecture space;
performing an evaluation of the sampled training data using the sample neural network architecture;
updating, based on the evaluation, the first probability distribution to generate a second probability distribution;
determining whether termination criteria is satisfied; and
when it is determined that the termination criteria is not satisfied:

determining, based on the second probability distribution, a second sample neural network architecture;

performing a second evaluation of the second sample neural network architecture based on training data from the training data store;

updating, based on the second evaluation, the second probability distribution to generate a third probability distribution; and generating a result neural network architecture based on the third probability distribution.

9. The method of claim 8, wherein performing the evaluation of the sampled training data comprises:

evaluating the sampled training data using the sampled neural network architecture to compute a gradient of a loss function associated with the sampled neural network architecture.

10. The method of claim 9, wherein updating the first probability distribution to generate the second probability distribution comprises:

updating the first probability distribution to generate the second probability distribution based on the computed gradient of the loss function.

11. The method of claim 8, wherein determining whether the termination criteria is satisfied comprises comparing a first accuracy of a neural network architecture associated with the first probability distribution and a second accuracy of a neural network architecture associated with the second probability distribution based on a predetermined threshold.

12. The method of claim 8, further comprising:

training the result neural network architecture using training data from the training data store.

13. The method of claim 8, wherein the first probability distribution is determined based on a surrogate neural network architecture that was determined using a dataset surrogate, wherein the dataset surrogate comprises a different set of training data from the training data store than a set of training data used when sampling training data from a training data store.

14. A method for generating a neural network architecture, comprising:

sampling training data from a training data store;

generating a sampled neural network architecture using a first probability distribution associated with a neural network architecture parameter, wherein a value is determined for the neural network architecture parameter based on the first probability distribution;

evaluating the sampled training data using the sampled neural network architecture to compute a gradient of a loss function associated with the sampled neural network architecture;

generating a second probability distribution for the neural network architecture parameter from the first probability distribution, based on the computed gradient of the loss function;

evaluating the second probability distribution based on termination criteria to determine whether the termination criteria is satisfied; and when it is determined that the termination criteria is not satisfied:

generating a second sampled neural network architecture using the second probability distribution;

evaluating training data from the training data store using the second sampled neural network architecture to compute a gradient of a loss function associated with the second sampled neural network architecture;

generating a third probability distribution for the neural network architecture parameter from the second probability distribution; and generating a result neural network architecture having a value for the parameter based on the third probability distribution.

15. The method of claim 14, wherein determining whether the termination criteria is satisfied comprises comparing a first accuracy of a neural network architecture associated with the second probability distribution and a second accuracy of a neural network architecture associated with the first probability distribution based on a predetermined threshold.

16. The method of claim 14, wherein the sampled neural network architecture is generated from a neural network architecture space.

17. The method of claim 14, further comprising:

training the result neural network architecture using training data from the training data store.

18. The method of claim 14, wherein the first probability distribution is determined based on a surrogate neural network architecture that was determined using a dataset surrogate, wherein the dataset surrogate comprises a different set of training data from the training data store than a set of training data used when sampling training data from a training data store.

19. The method of claim 14, wherein the first probability distribution is a uniform distribution.

20. The method of claim 14, wherein the third probability distribution for the neural network architecture parameter is generated based on the computed gradient of the loss function associated with the second sampled neural network architecture.

\* \* \* \* \*